United States Patent [19]
Wright

[11] Patent Number: 5,127,819
[45] Date of Patent: Jul. 7, 1992

[54] VALVE GATE MANIFOLD

[75] Inventor: Peter S. Wright, Blackwood, Australia

[73] Assignee: F. F. Seeley Nominees Pty. Ltd., South Australia, Australia

[21] Appl. No.: 612,556

[22] Filed: Nov. 13, 1990

[30] Foreign Application Priority Data

Nov. 14, 1989 [AU] Australia .................... PJ7388

[51] Int. Cl.⁵ ............................................ B29C 45/23
[52] U.S. Cl. .............................. 425/549; 264/328.9; 264/328.15; 425/564; 425/565; 425/566
[58] Field of Search ............... 425/549, 568, 570, 562, 425/563, 564, 565, 566, 557, 559; 264/328.9, 328.15

[56] References Cited
U.S. PATENT DOCUMENTS

| 4,043,726 | 8/1977 | Tsunemoto et al. | 425/563 |
| 4,669,971 | 6/1987 | Gellert | 425/573 |

Primary Examiner—Tim Heitbrink
Attorney, Agent, or Firm—Brown, Martin, Haller & McClain

[57] ABSTRACT

A valve gate manifold for an injecting machine has at least three plates in tandem with one another, the first plate being circular and having in its several die positioning rings each with an injecting nozzle, the second plate being a manifold plate having a master valve and internal passages leading to the injecting nozzles, and the third plate carrying piston/cylinder assemblies which control the injecting nozzles. The face of the first plate can lie copolanar with the platen face of the injecting machine, and the manifold can be contained in an aperture through the platen.

7 Claims, 3 Drawing Sheets

VALVE GATE MANIFOLD

This invention relates to a valve gate manifold which is useful for mounting a plastics injection moulding tool for the polymeric material into the cavity of the tool.

BACKGROUND OF THE INVENTION

In relatively large moulding machines, it is usual to have a platen (usually vertical) which carries on it a moulding die, and if the moulding is large dimensionally the die usually requires multiple injection points. Heated polymeric material is fed to these injection points, and injected through nozzles and into a die cavity, the nozzles being provided with hydraulically actuated valve means to control the injection flow.

There is a heated flow transportation and control system for the polymeric material which is normally attached to the die, but it sometimes comprises a manifold attached to the front face of the platen, where dies engage it independently for different moulding requirements. A master valve assembly (termed a "valve gate") controls flow to the injecting nozzles.

However, because of the existence of the master valve assembly, the requirement to heat the manifold in order to retain the polymeric material in fluent form within it, and the space occupied by hydraulic control means of the shut-off pins at the injecting nozzle locations and also the master valve assembly, the overall depth is considerable, and this reduces the distance between platens, in turn placing dimensional limits on the tools which can be utilised, and their handling equipment.

The main object of this invention is to provide improvements whereby, firstly, the capacity size of a moulding machine is not so reduced, and a larger die can be utilised in a machine, secondly, whereby the location of the injection points for a die can be varied to be most suitable for that die, and thirdly whereby the platen face remains available for the securing of dies or their accessories.

BRIEF SUMMARY OF THE INVENTION

In this invention, a valve gate manifold for an injecting machine comprises at least three plates in tandem with one another, the first plate being circular and having in it several die positioning rings each with an injecting nozzle, the second plate being a manifold plate having a master valve ("valve gate") and internal passages leading to the injecting nozzles, and the third plate carrying piston/cylinder assemblies which control the injecting nozzles. The face of the first plate can lie coplanar with the platen face of the injecting machine, and the manifold can be contained in an aperture through the platen.

In most instances, all plates are circular, but the first plate has a larger diameter than those behind it. It can then be recessed into an annular register in the platen coaxial with the aperture, and can be rotated through increments to suit different moulding die requirements. The whole assembly of the valve gate manifold can be supported by the aperture and register walls, and retained by bolts passing through the periphery of the first plate and threadably engaging tapped holes in the shoulder of the platen register.

More specifically, the invention consists of a valve gate manifold for an injection moulding machine having a platen for die retention, the manifold comprising at least three plates arranged in tandem, the front of said plates being a nozzle plate of general discoid shape and having a front face which includes a plurality of die positioning rings, and respective injecting nozzle inserts retained centrally in said rings, the second of said plates being a manifold plate containing a master valve assembly, and internal surfaces defining passages extending from a downstream side of the valve assembly to respective said nozzle inserts, the third of said plates being a cylinder plate carrying a plurality of nozzle actuating piston/cylinder assemblies each coaxial with and operatively coupled to a respective said injecting nozzle, and fasteners retaining said plates in contiguity with one another.

DESCRIPTION OF THE PREFERRED EMBODIMENT

An embodiment is described hereunder in some detail with reference to, and is illustrated in the accompanying drawings in which.

Figure 1:
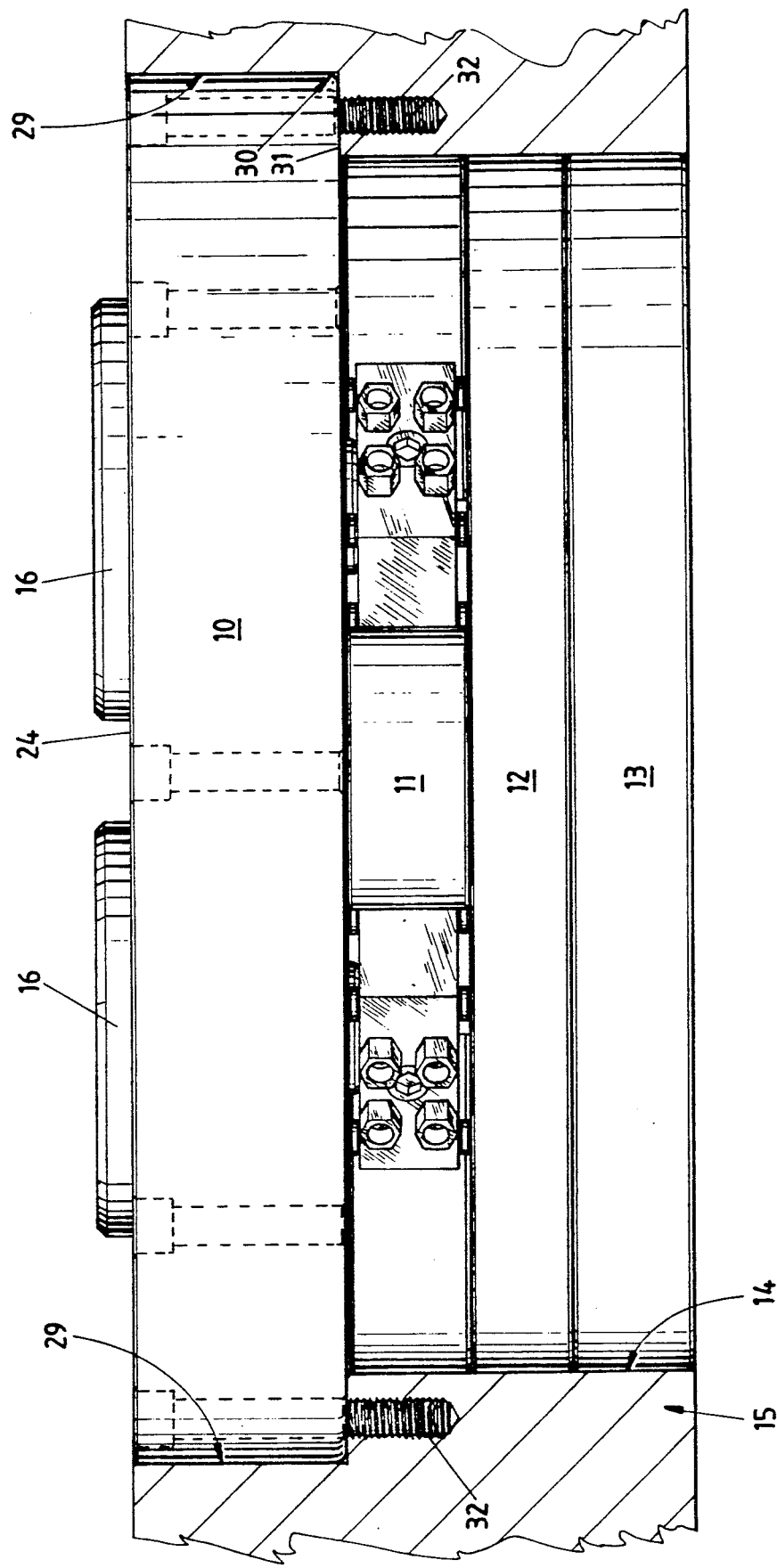
FIG. 1 is a plan view of a valve gate manifold system including the abovementioned four plates.
Figure 2:
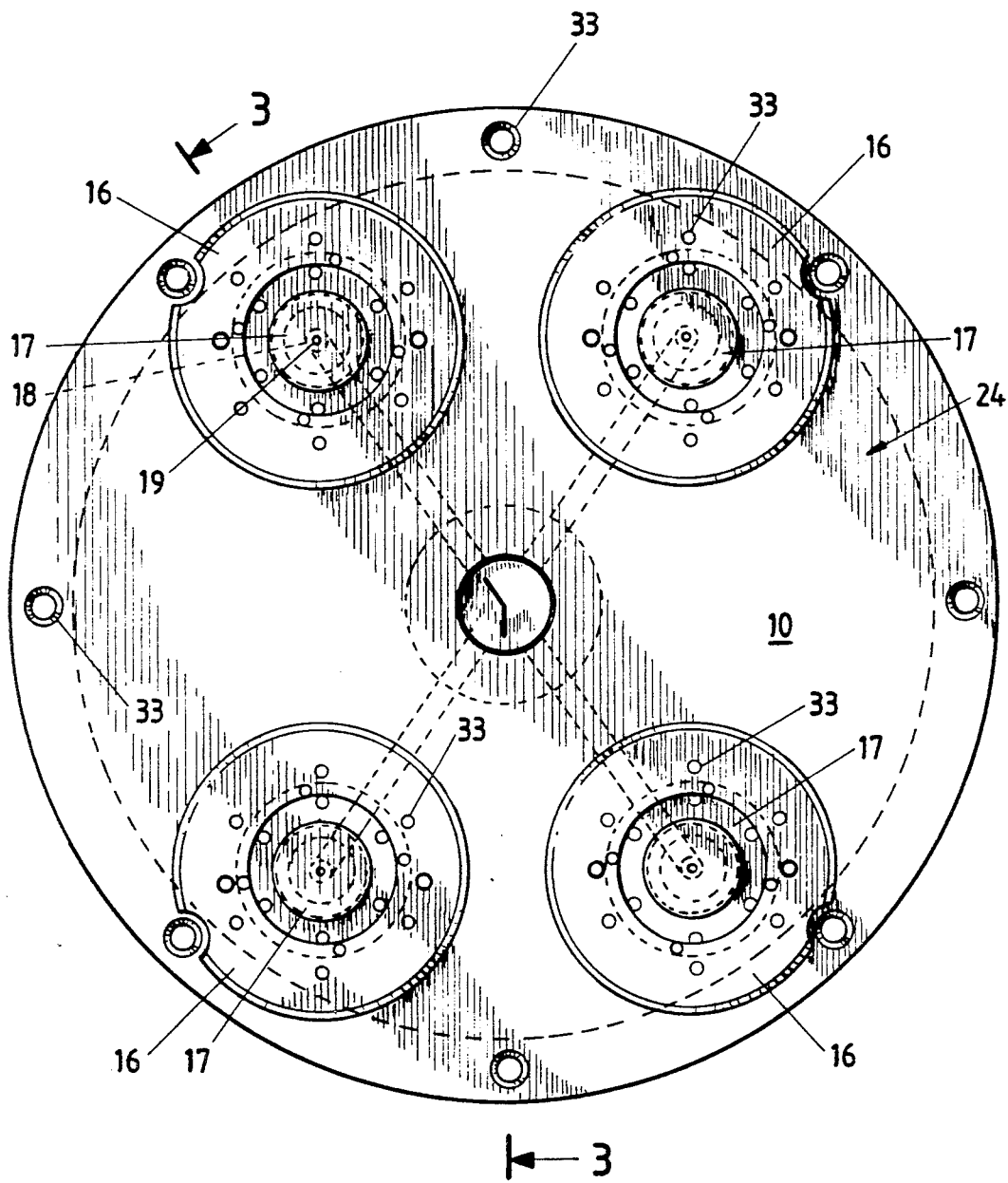
FIG. 2 is a front elevation.

In this embodiment, a valve gate manifold system comprises a discoid shaped front plate 10 which is a nozzle plate, and contiguous with the rear surface of that is a manifold plate 11, behind the manifold plate is a cylinder plate 12 and behind that, the rearmost plate is a backing plate 13.

All the above plates are discoid in shape, having circular peripheries, and all are inset into a circular aperture 14 in a platen 15, but have sufficient clearance that they can be rotated for repositioning in a different angular position with respect to the platen 15. The front plate 10, (the nozzle plate) has four die positioning rings 16 which are spaced circumferentially around it, and each of these die positioning rings is provided with an injecting nozzle insert 17 which contains an injecting nozzle 18, the centre of which contains a shut-off pin 19 actuated by an hydraulic piston/cylinder assembly 20. Electrical heating provisions are also made by heating elements 21 to maintain the polymeric material in a fluent state between injection cycles.

The manifold plate 11 also contains a master shut-off valve assembly 22 which interupts a central flow passage to the nozzles 18 via the galleries 18a in manifold plate 11. The cylinder plate 12 performs the function of supporting the four hydraulic cylinders 20 which actuate the shut-off pins 19, while the backing plate 13 supports the valve assembly 22, and assists in retaining the assembly of the elements.

Figure 3:
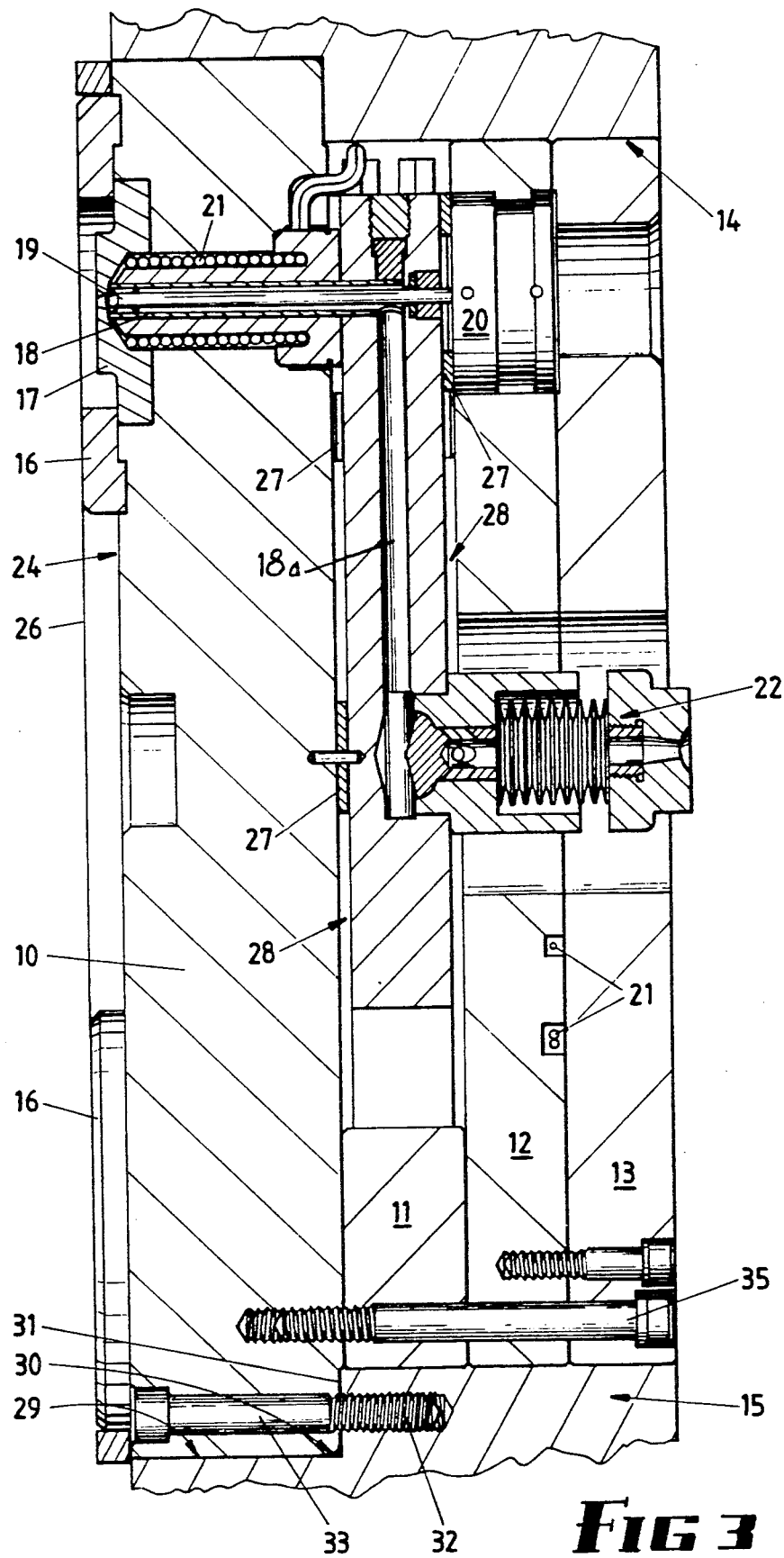
FIG. 3 is a section taken on line 3—3 of FIG. 2.

The die location rings 16 are shown to stand forwardly from the surface 24 of the platen 15, but in some embodiments the aperture 14 in the platen can be deeper and the die location rings 16 can be coplanar with the surface 24. However, as shown in FIG. 3, the projecting rings 16 provide means for utilising a spacer sheet 26 of heat insulating material, for example of fibre reinforced plastics, which reduces heat transfer to a moulding die. Similarly, spacer pads 27 are used between the first plate 10 and manifold plate 11, and between manifold plate 11 and cylinder plate 12, to create an air gap 28 therebetween which also functions to insulate the relatively hot manifold plate 11. In an alternative arrangement the front plate 10 may contain cooling passages, and be cooled with a coolant flowing through.

As seen in FIGS. 1 and 3, the aperture 14 extends the full depth of platen 15, but its diameter is greater at the mouth 29 than rearwardly thereof, providing a register 30, and the planar shoulder 31 thereof contains tapped holes 32 which are threadably engaged by bolts 33, which retain the manifold in position. As shown, there are eight bolts, so that the manifold position can be varied in increments of 45°, but clearly this can be changed as required. The plates are retained in contiguity by the bolts 35 which enter from the rear plate 13.

A consideration of the above embodiment will indicate the invention to be one of great simplicity, and many of the features in the manifold system are in accordance with known art. However there is a substantial commercial advantage in having a manifold system which is contained within the platen of an injection moulding machine, as said above, providing greater space for containing a die and also providing means which can be simply rotated to reposition the various injection nozzles 18.

I claim:

1. A platen and valve gate manifold assembly for an injection molding machine, comprising:

a platen having a front surface and a circular mounting recess extending inwardly from said platen front surface;

a manifold comprising a first plate, a second plate and a third plate arranged in tandem within said mounting recess;

said first plate being a front plate of said manifold plates comprising a nozzle plate of discoid shape, having a circular peripheral wall contiguous with and rotatable within said circular mounting recess of the platen, the nozzle plate having a front face;

a plurality of die positioning rings carried by the nozzle plate at said nozzle plate front face;

respective injecting nozzle inserts retained centrally in said rings;

said second plate being a manifold plate containing a master valve assembly, and internal surfaces defining passages extending from a downstream side of the valve assembly to respective said nozzle inserts; and said third plate being a cylinder plate carrying a plurality of nozzle actuating piston cylinder assemblies each coaxial with and operatively coupled to a respective said injecting nozzle, and fasteners retaining said plates in contiguity with one another.

2. The assembly according to claim 1 comprising a fourth plate being a backing plate which supports both said master valve assembly and said plurality of piston cylinder assemblies, said fasteners also retaining the fourth plate in contiguity with the third plate.

3. The assembly according to claim 1 further comprising heating means in said front plate surrounding respective said nozzles for heating material in said nozzles between injection cycles.

4. The assembly according to claim 3 further comprising spacer means between said front and second plates for creating an air gap therebetween.

5. The assembly according to claim 1 further comprising a spacer sheet extending over said front plate, and containing apertures which contain said die positioning rings.

6. The assembly according to claim 1 wherein said circular aperture walls of the platen extend through the platen from said front face.

7. The assembly according to claim 6 wherein said circular aperture walls of the platen are of stepped diameter, having a larger diameter at said locality of the front face than rearwardly thereof so as to define a register which comprises a planar shoulder, a plurality of threaded holes extending into said platen from said shoulder, and a plurality of retaining bolts threadably engaging said threaded holes and retaining said manifold to said platen.

* * * * *